United States Patent

Emmett et al.

[11] Patent Number: 5,636,956
[45] Date of Patent: Jun. 10, 1997

[54] FASTENER AND SCREW MEANS THEREFOR

[76] Inventors: John E. Emmett, 52 Hillrise Park, Clydach, Swansea SA6 5DX, United Kingdom; Philip A. Davies, 36 Cecil Road, Gorseinon, Swansea SA4 4BY, United Kingdom

[21] Appl. No.: 481,524
[22] PCT Filed: Jan. 19, 1994
[86] PCT No.: PCT/GB94/00103
§ 371 Date: Jul. 11, 1995
§ 102(e) Date: Jul. 11, 1995
[87] PCT Pub. No.: WO94/17313
PCT Pub. Date: Aug. 4, 1994

[30] Foreign Application Priority Data

Jan. 20, 1993 [GB] United Kingdom ............... 9301096
Sep. 17, 1993 [GB] United Kingdom ............... 9319321

[51] Int. Cl.$^6$ .................. F16B 37/02; F16B 33/02
[52] U.S. Cl. .................. 411/366; 411/527; 411/437; 411/414
[58] Field of Search .................. 411/366, 411, 411/414, 424, 437, 527

[56] References Cited

U.S. PATENT DOCUMENTS

| 1,411,184 | 3/1922 | Rosenberg | 411/411 |
| 2,169,057 | 8/1939 | Place | 411/437 |
| 2,171,773 | 9/1939 | Von Mertens | 411/527 |
| 2,172,258 | 9/1939 | Place | 411/437 |
| 3,124,191 | 3/1964 | Forslund | 411/414 |

FOREIGN PATENT DOCUMENTS

| 642952 | 3/1937 | Germany | 411/437 |
| 1267355 | 3/1972 | United Kingdom | 411/411 |

*Primary Examiner*—Flemming Saether
*Attorney, Agent, or Firm*—Bliss McGlynn, P.C.

[57] ABSTRACT

A fastener is a screw having a threaded shaft, and a fastening strip or sheet having a raised portion provided with an aperture being preformed to have an at least partly helical threadform-defining edge shaped and dimensional to matingly receive the threaded shaft of the screw. The crests of the threaded shaft have an asymmetrical surface profile in the axial direction of the threaded shaft which enables the shaft to withstand greater applied torque.

11 Claims, 4 Drawing Sheets

FIG 3
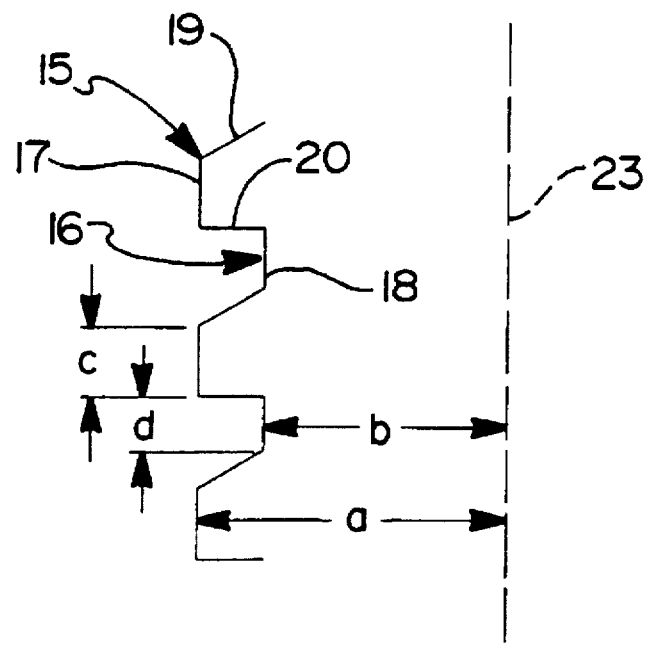
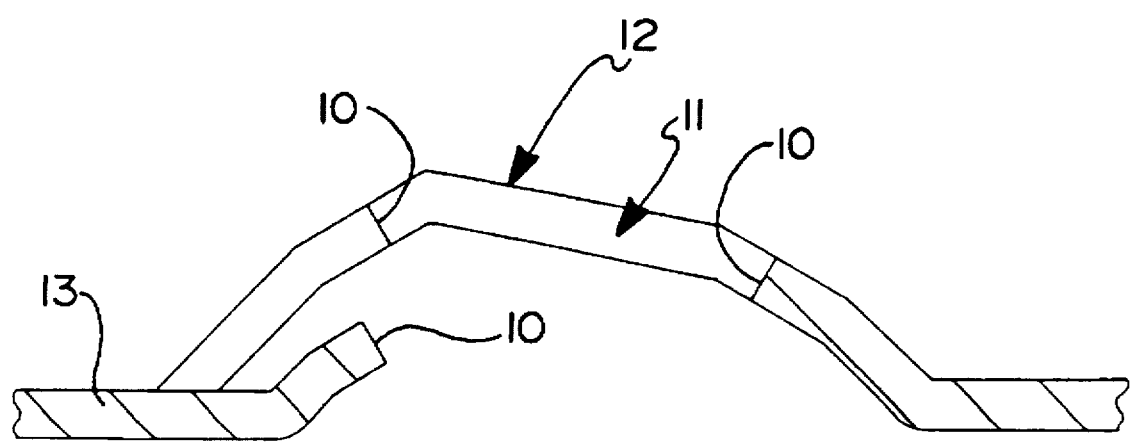
FIG 4

FASTENER AND SCREW MEANS THEREFOR

The present invention relates to fasteners, and particularly to fasteners of the type comprising screw means.

Sheet metal threadform fasteners are well known and used in industry for low torque fastening. Fasteners of this type sometimes comprise a generally "U" shaped clip having adjacent limbs, one of which limbs has a threadform aperture arranged to matingly engage with a threaded shaft of screw means comprising a bolt or screw, the other limb having a plain orifice through which the shaft may pass.

We have now devised an improved fastener suitable for use in applications requiring higher torque than is achievable with prior art fasteners of the type referred to.

According to the invention, there is provided a fastener comprising, in combination:

a) screw means having a screw threaded shaft, wherein the crests of the threaded shaft have an asymmetrical surface profile in the axial direction of the shaft; and b) a fastening strip or sheet having a raised portion with an aperture therethrough, said aperture being preformed to have an at least partly helical threadform-defining edge which is shaped and dimensioned such that the threaded shaft of said screw means may be threadably mated therewith.

In addition to the inventive combination of a fastener comprising screw means and a fastening strip or sheet as defined, it is also believed that screw means as defined herein is novel per se.

It is preferred that radially the outermost portions of the crests of the screw thread of the screw means are substantially flat.

Typically, the crest of the screw thread is defined by respective flank portions, the flank portions preferably comprising respective substantially flat portions.

It is preferred that the flank portions are orientated at respectively different angles to the axis of the threaded shaft. Advantageously one of the respective flank portions is orientated substantially perpendicular to the axis of the threaded shaft with the other one of the respective flat portions being inclined at an acute angle, preferably in the range 50° to 70°, to the axis. Desirably, the respective flank portions of the crest of the head are connected by a crest portion extending transversely to the respective flank portions.

It is preferred that the flat flank portion orientated substantially perpendicular to the axis of the threaded shaft is less extensive radially than is the flat portion orientated at an acute angle to the axis of the shaft.

It is preferred that the threaded shaft is provided with a drivable end or head portion, such as a bolt or screw head or the like, to which a torque may be applied.

Typically, in use the threaded shaft will be driven through at least one apertured object body (such as one or more plate members) and secured in place by the fastening strip or sheet such that the or each object body is securely gripped between the drivable end or head of the threaded shaft and the fastening strip.

It is particularly preferred that the volume of material comprising the thread between the minor and major diameters of the threaded shaft is not less than, and more preferably greater than, the volume of the space between adjacent thread portions between the minor and major diameters of the threaded shaft.

Typically one, or more preferably both, of the screw means and the fastening strip or sheet are of metallic construction.

Advantageously, the fastening strip or sheet comprises a generally "U" shaped clip having first and second limbs extending adjacent one another and away from an interconnecting web portion. Typically, the raised portion of the fastening strip provided with the threaded aperture is provided on one of the limbs.

Typically, the threadform-defining edge of the aperture in the raised portion of the fastening strip will be substantially helical at least along a portion thereof. Advantageously, the helical portion of the threadform-defining edge comprises substantially one complete helical turn. Typically corresponding portions of the threadform-defining edge, one helical turn apart will be spaced in the axial direction by a distance substantially equal to the pitch of the thread of the threaded shaft.

Desirably, the raised portion of the fastening strip immediately adjacent the threadform-defining aperture is angled to lie contiguous with the acutely angled flat portion of a respective flank portion.

The invention will now be further described in a specific embodiment by way of example only, and with reference to the accompanying drawings, in which:

FIG. 3 is an explanatory sectional view of a screw used in the fastener of FIG. 2;

FIG. 4 is a sectional view of part of the fastening strip or sheet of the fastener of FIG. 2;

Figure 1:
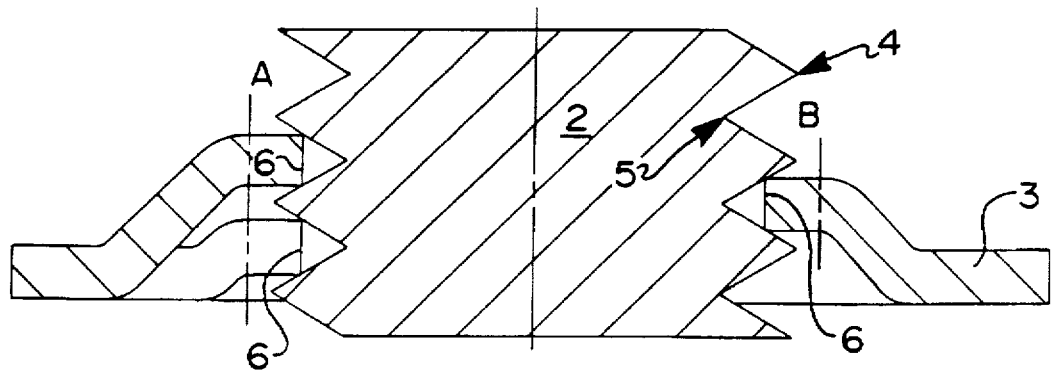
FIG. 1 is a cross-sectional view of part of a prior art fastener.
Figure 2:
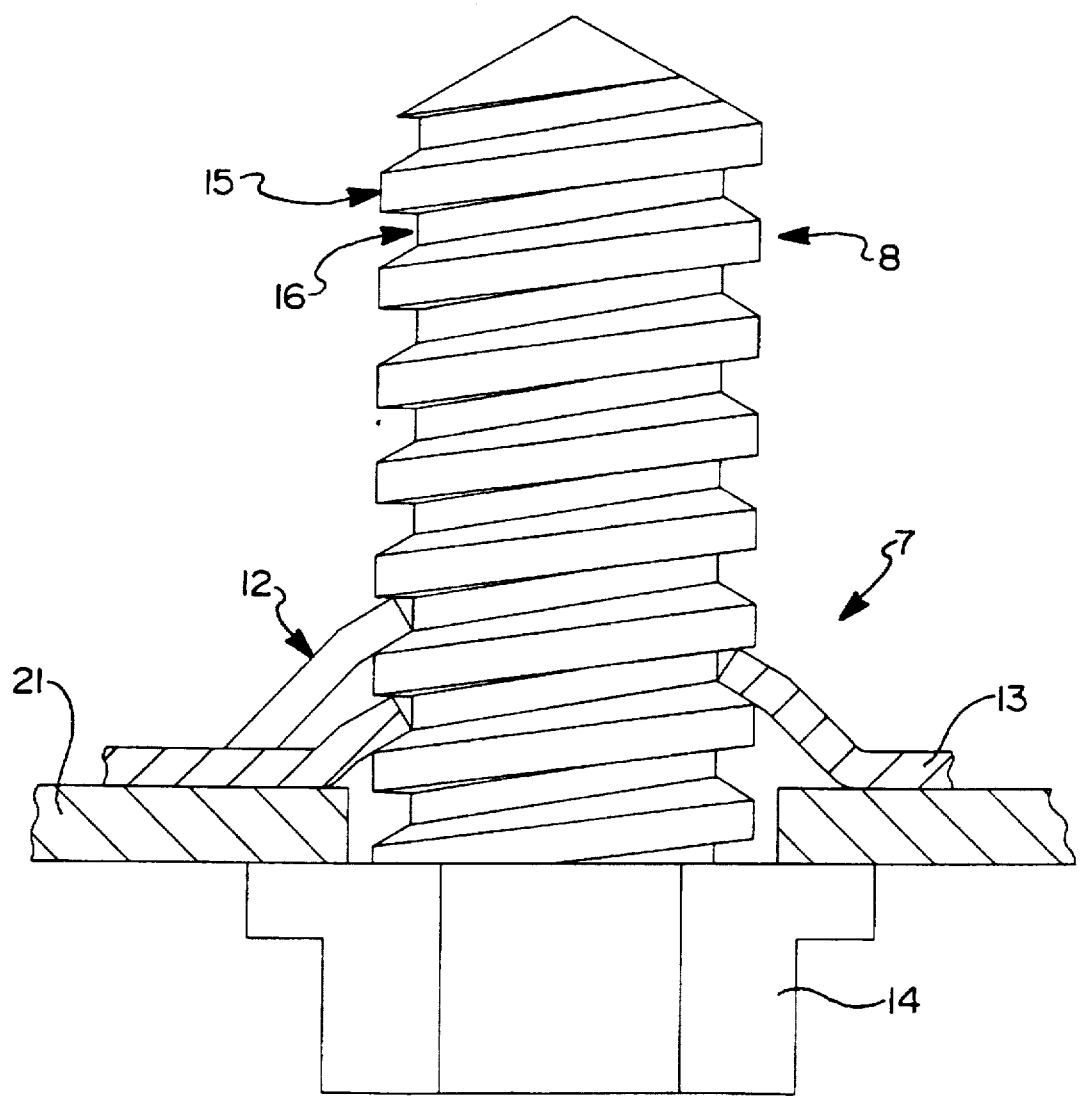
FIG. 2 is a partial cut-away view of a fastener according to the invention in use.

Referring to the drawings, and initially to FIG. 1 in particular, there is shown part of a fastener of the type generally referred to as a sheet metal threadform fastener. The fastener comprises a threaded shaft 2 of a bolt or screw which threadingly engages with a threadform aperture in a raised portion of a metal fastener strip or sheet 3. The surface profile of the screw thread of sheet 2 typically comprises symmetrical "V" shaped crests 4 and roots 5 such as those typically found on ISO metric or Whitworth thread types.

The threadform-defining edge 6 of the aperture is substantially helical and engages in the "V" shaped profile of the thread as shown. A sheet or plate of material to be gripped is typically clamped between the head of the screw or bolt and the fastener strip or sheet 3 with the shaft 2 passing through an aperture in the sheet or plate being gripped and threadingly engaging with the threadform aperture in the fastener strip or sheet 3.

Typically fasteners of this type are suitable for applications where a relatively low torque is applied to the screw or bolt. Above this torque range, failure of the fastener occurs either due to buckling of the raised portion of the fastener strip or sheet 3 (along lines A, B), or due to the thread being stripped from the threaded shaft 2.

Referring to FIGS. 2 to 5, which relate to a first embodiment of an improved fastener according to the invention; the fastener generally designated 7, comprises a threaded screw or bolt 8 having a threaded shaft 9 which is threadably engageable with the threadform-defining edge 10 of a thread form aperture 11 in a raised portion 12 of a fastener strip or sheet 13. In use, the bolt 8 is tightened in the threadform aperture 11 to clamp an object sheet or plate 21 between the head 14 of the bolt and the fastening strip or sheet 13.

Referring to FIG. 3, the threaded shaft 9 has a threaded surface profile comprising crests 15 and roots 16 which are asymmetrical in surface profile in the axial direction of shaft 9. The crests 15 and roots 16 have respective flattened portions 17, 18 at their limits defining the major and minor diameters a, b of the thread respectively. It should be noted that the extent of flat portion 17 in the axial direction (dimension c) is greater than the extent of flat portion 18 in the axial direction (dimension d). This feature has the effect of producing a thread having an unusually large volume of material in the thread crests 15 compared to the volume of the space intermediate adjacent crests, thereby improving the shear strength of the thread and hence the torque which may be applied to the shaft 9 before the thread is stripped. The flanks 19, 20 of the thread crests 15 are oriented at 60° and perpendicular to the shaft axis 23 respectively. This difference in angular orientation, (or form) of flanks 19, 20 gives rise to and is what is meant by the threaded shaft having an asymmetrical surface profile in the axial direction of the shaft.

Referring to FIG. 4, the fastener strip or sheet 13 is generally similar to the prior art fastener strip or sheet 3 described above. It should be noted however that the portion of the strip or sheet 13 immediately adjacent the threadform defining edge 10 of the aperture 11 is angled complementarily to the flank 19 of the threaded shaft 9 (that is, at 60° to the axis of the shaft 9).

Figure 5:
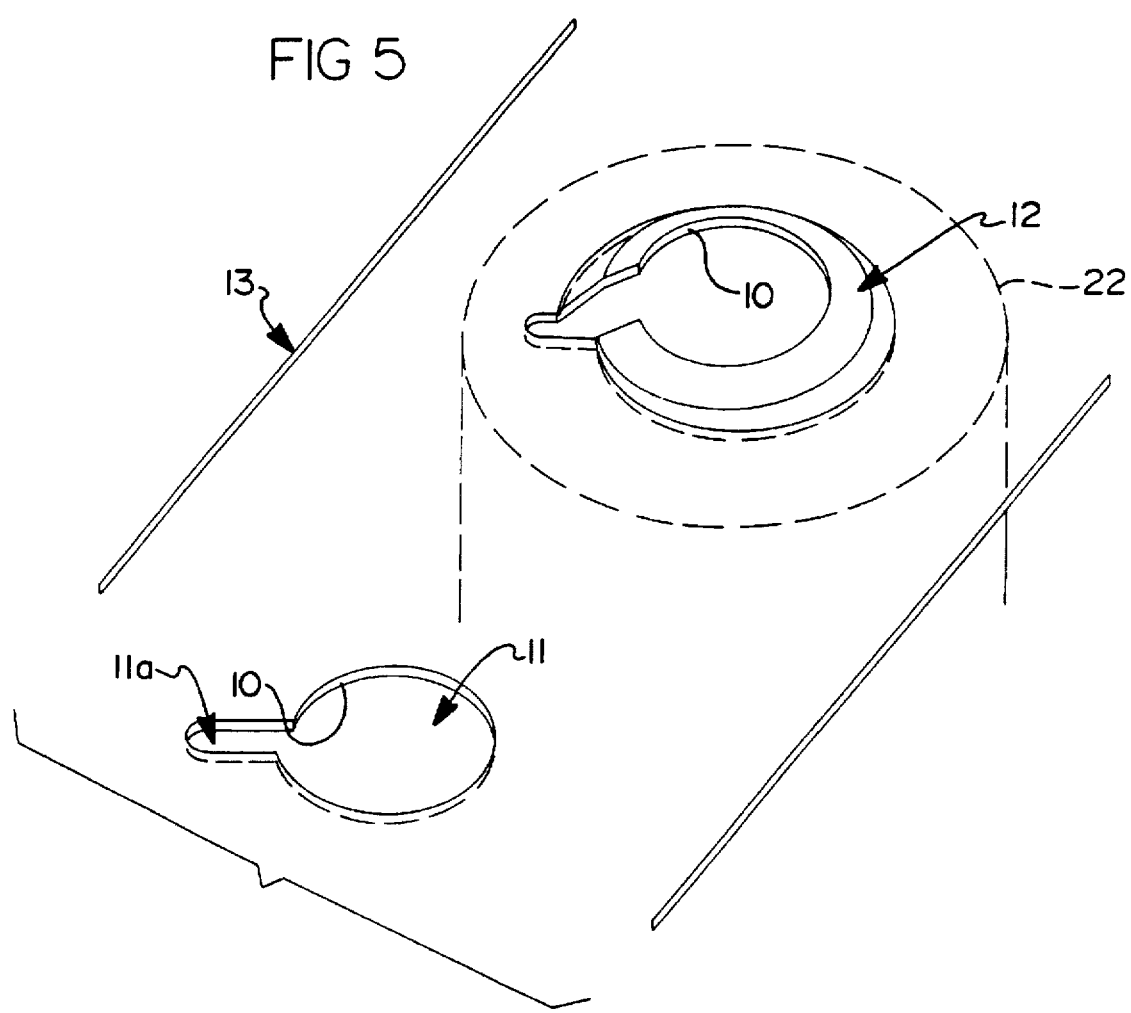
FIG. 5 is an explanatory perspective view of the method of forming the fastening strip or sheet of the fastener of FIG. 2.

Problems have existed in the manufacture of prior art fastener strips in achieving consistency of shape and dimensions of the raised portion 12, aperture 11, and threadform-defining edge 10. Referring to FIG. 5, the fastener strip 13 of the present invention may be manufactured by first stamping aperture 11 in the strip or sheet 13. The aperture 11 is generally keyhole shaped comprising a spiral shaped (not substantially circular as is the case with the prior art threadform apertures when stamped) portion and provided with an outwardly extending finger-shaped slot 11a. Subsequently the raised portion 12 and helical threadform-defining edge 10 may be formed by means of plastically deforming the portion of the strip surrounding aperture 11 between two complementarily shaped formers 22 (only one is shown). The strips may then be cut to size and, for certain applications, subsequently deformed to the typical "U" shaped clip.

Figure 6:
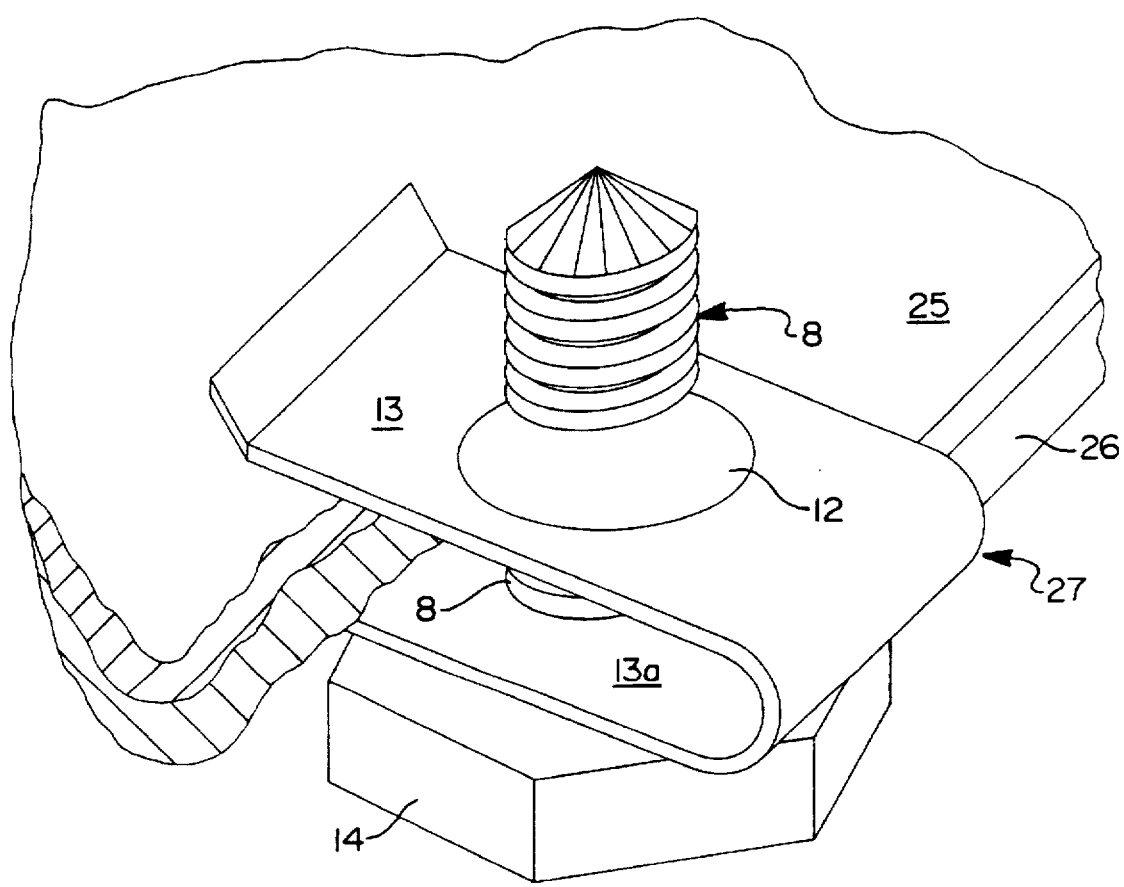
FIG. 6 is a partially cut away perspective view of a "V" shaped clip fastener embodying the invention, in use.

For prior art fastener strips it is necessary to harden the strip material (by heat treatment or otherwise) subsequently to forming the threadform aperture 11 in raised portion 12. For the strip according to the fastener of the present invention, it has been found that it is not necessary always to subsequently harden the strip material. Referring to FIG. 6, there is shown a "U" shaped clip fastener 27 according to the invention in use. A pair of plates 25, 26 are placed between the arms 13, 13a of the clip fastener and the shaft 8 of the bolt inserted through aligned apertures in limb 13a and plates 25, 26, with the thread of shaft 8 threadably mating with the threadform aperture in raised portion 12 of arm 13. As the head 14 of the bolt is tightened, the plates 25, 26 are securely clamped between the arms 13, 13a.

Figure 7:
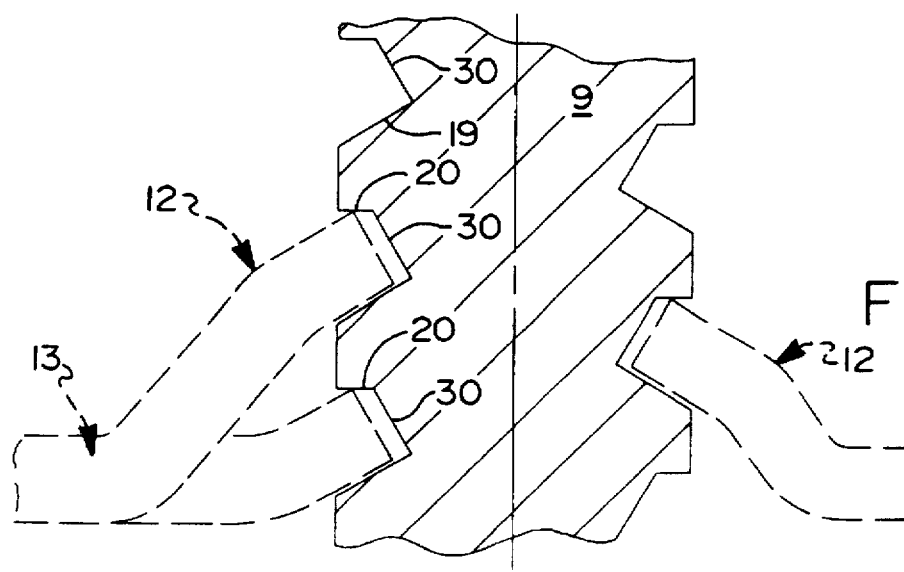
FIG. 7 is an explanatory sectional view of an alternative embodiment of fastener according to the invention utilising an alternative threadform for the threaded shaft of the screw means.

Referring to FIG. 7, there is shown an alternative embodiment of fastener according to the invention. In the embodiment shown, the threadform aperture 11 and raised portion 12 of fastener strip 13 are substantially identical to the corresponding parts of fastener strip 13 referred to above in relation to FIGS. 2 to 6. The threadform profile of threaded shaft 9, whilst asymmetrical in the axial direction of the shaft, is however different to the threadform profile described in FIGS. 2 to 6. In the embodiment shown in FIG. 7, the 90° angle between root 18 and flank 20 of the embodiment shown in FIG. 3 has been replaced with an angled surface 30. When forming threadform profile of threaded shaft 9, less material is removed from the shaft, and the need to form a 90° shoulder (between root 18 and flank 20) is dispensed with. This is considered to be an improvement since the threadform profile is easier to manufacture and also the structural strength of the shaft is improved since stress concentrations which would be present at such a 90° shoulder are alleviated.

Fasteners according to the invention have been shown to be capable of withstanding applied torques significantly in excess of those acheivable with prior art fasteners, and are therefore suitable for use in a wide range of applications for which prior art fasteners are unsuitable. For example, fasteners according to the invention, in addition to being used as replacements for known threadform fasteners may be used to replace conventional screw/nut type fasteners, screw/welded nut type fasteners etc.

Furthermore, trials with screw means according to the invention (and as shown for example in FIGS. 2, 3, 6 and 7) have shown that the screw means per se may be used to replace traditional screws in other applications such as fixing in wood, plastics, metal etc. In such applications screw means according to the invention have been shown to have improved torque and other characteristics compared to known screw means.

We claim:

1. A fastener comprising, in combination:

a) a screw means having a threaded shaft and a screw thread extending in an axial direction along the threaded shaft, the screw thread comprising a crest having a generally flat portion which is parallel to the axial direction and a first flank portion inclined at an angle to an axis of the threaded shaft, the crest having an asymmetrical surface profile in the axial direction of the threaded shaft; and b) one of a group comprising a fastening strip or sheet having a raised portion with an aperture therethrough, the aperture being preformed to have an at least partly helical threadform-defining edge which is shaped and dimensioned such that the threaded shaft of the screw means may be threadably mated therewith and which extends continuously through a substantially complete helical turn, the raised portion of the one of the group comprising the fastening strip or sheet immediately adjacent the threadform-defining edge of the aperture being inclined correspondingly to the first flank portion of the threaded shaft of the screw means along substantially the entire threadform-defining edge of the aperture.

2. A fastener according to claim 1, wherein the aperture has a non helical edge portion connecting with the threadform-defining edge.

3. A fastener according to claim 1, wherein a radially outermost portion of the crest of the screw thread of the threaded shaft of the screw means is substantially flat.

4. A fastener according to claim 1, wherein the crest of the screw thread of the threaded shaft of the screw means comprises a second flank portion.

5. A fastener according to claim 4, wherein the first and second flank portions are orientated at respectively different angles to the axis of the threaded shaft.

6. A fastener according to claim 5, wherein the second flank portion is arranged substantially perpendicular to the axis of the threaded shaft.

7. A fastener according to claim 6, wherein the second flank portion is less extensive radially than is the first flank portion which is inclined at an acute angle to the axis of the threaded shaft.

8. A fastener according to claim 1, wherein the volume of material comprising the screw thread in the region between minor and major diameters of the threaded shaft of the screw means is not less than the volume of the space between adjacent thread portions in the region between the minor and major diameters of the threaded shaft.

9. A fastener according to claim 1, wherein adjacent portions of the threadform-defining edge, one helical turn apart, are spaced in the axial direction by a distance substantially equal to the pitch of the screw thread of the threaded shaft of the screw means.

10. A fastener according to claim 1, wherein the threadform-defining aperture is preformed from a keyhole shaped aperture provided in the one of the group comprising the fastening strip or sheet prior to preforming of the raised portion.

11. A fastener according to claim 10, wherein the keyhole shaped aperture comprises a spiral edged portion connecting with an outwardly extending finger portion.

* * * * *

UNITED STATES PATENT AND TRADEMARK OFFICE
CERTIFICATE OF CORRECTION

PATENT NO. : 5,636,956
DATED : June 10, 1997
INVENTOR(S) : John E. Emmett et al.

It is certified that error appears in the above-indentified patent and that said Letters Patent is hereby corrected as shown below:

Title Page, Column 2, Under "References Cited - U.S. Patent Documents" insert
-- 935817      7/62      Dzus
   4659246     4/87      Sugiyama --.

Title Page, Column 2, Under "References Cited - Foreign Patent Documents" insert
-- 0242273     7/87      Berlin
   2325296     1/74      France --.

Signed and Sealed this

Second Day of September, 1997

Attest:

BRUCE LEHMAN

*Attesting Officer*           *Commissioner of Patents and Trademarks*